United States Patent
Kobayashi

(10) Patent No.: US 7,305,456 B2
(45) Date of Patent: Dec. 4, 2007

(54) DEVICE INFORMATION ACQUIRING METHOD, SERVER APPARATUS AND COMPUTER-READABLE STORAGE MEDIUM

(75) Inventor: Hiroki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 826 days.

(21) Appl. No.: 10/308,141

(22) Filed: Dec. 3, 2002

(65) Prior Publication Data

US 2003/0131072 A1    Jul. 10, 2003

(30) Foreign Application Priority Data

Dec. 5, 2001    (JP)    .............................. 2001-370882

(51) Int. Cl.
| | |
|---|---|
| G06F 15/16 | (2006.01) |
| G06F 15/177 | (2006.01) |
| G06F 9/44 | (2006.01) |
| G06F 3/00 | (2006.01) |
| G06F 9/46 | (2006.01) |
| G06F 15/173 | (2006.01) |
| G06F 11/00 | (2006.01) |
| G06F 9/445 | (2006.01) |
| G06F 13/00 | (2006.01) |

(52) U.S. Cl. ...................... 709/218; 709/220; 709/223; 709/224; 709/227; 709/248; 709/249; 714/38; 717/170; 717/171; 717/176; 719/315; 719/316

(58) Field of Classification Search ................ 709/202, 709/203, 217–220, 223, 224, 227, 248, 249; 714/38, 44; 717/168–178; 719/315–317
See application file for complete search history.

(56) References Cited

U.S. PATENT DOCUMENTS

| | | | | |
|---|---|---|---|---|
| 5,247,669 | A | * | 9/1993 | Abraham et al. ....... 707/103 R |
| 5,580,177 | A | | 12/1996 | Gase et al. |
| 5,815,722 | A | * | 9/1998 | Kalwitz et al. ............. 717/178 |
| 5,974,477 | A | | 10/1999 | Kobayashi |

(Continued)

FOREIGN PATENT DOCUMENTS

EP    1 022 652    7/2000

(Continued)

OTHER PUBLICATIONS

Swift, Michael M. et al. "Recovering Device Drivers," ACM Transactions on Computer Systems, vol. 24, No. 4, Nov. 2006, pp. 333-360.*

(Continued)

*Primary Examiner*—Melvin H. Pollack
(74) *Attorney, Agent, or Firm*—Dickstein Shapiro LLP

(57) ABSTRACT

A device information acquiring method acquires device information related to devices from a Web site provided by a server apparatus via one or a plurality of networks. The method checks an environment of a client terminal from which the Web site is accessed, including at least one device usable by the client terminal, and sends environment information indicative of the environment to the server apparatus. Then, the method downloads device information of the at least one device, from the server apparatus to the client terminal, by a server execution program executed by the server apparatus, based on the environment information received from the client terminal. The method then installs the downloaded device information in the client terminal.

33 Claims, 12 Drawing Sheets

U.S. PATENT DOCUMENTS

| | | | | |
|---|---|---|---|---|
| 6,094,679 | A | * | 7/2000 | Teng et al. ................. 709/220 |
| 6,161,218 | A | * | 12/2000 | Taylor ........................ 717/174 |
| 6,243,774 | B1 | * | 6/2001 | Eide et al. .................. 710/302 |
| 6,347,398 | B1 | * | 2/2002 | Parthasarathy et al. ..... 717/178 |
| 6,564,215 | B1 | * | 5/2003 | Hsiao et al. ................... 707/8 |
| 6,567,793 | B1 | * | 5/2003 | Hicks et al. .................. 705/51 |
| 6,571,389 | B1 | * | 5/2003 | Spyker et al. ............. 717/176 |
| 6,594,690 | B2 | * | 7/2003 | Cantwell .................... 709/217 |
| 6,628,415 | B2 | * | 9/2003 | Lawrence et al. ......... 358/1.15 |
| 6,665,709 | B1 | * | 12/2003 | Barron ....................... 709/217 |
| 6,675,382 | B1 | * | 1/2004 | Foster ........................ 717/177 |
| 6,681,392 | B1 | * | 1/2004 | Henry et al. ............... 717/176 |
| 6,754,811 | B1 | * | 6/2004 | Cato et al. .................. 712/227 |
| 6,789,111 | B1 | * | 9/2004 | Brockway et al. .......... 709/222 |
| 6,799,222 | B1 | * | 9/2004 | Endo .......................... 709/248 |
| 6,807,559 | B1 | * | 10/2004 | Budhiraja ................... 709/203 |
| 6,813,670 | B1 | * | 11/2004 | Yao et al. ................... 710/302 |
| 6,814,510 | B1 | * | 11/2004 | Sabbagh et al. .............. 400/63 |
| 6,825,941 | B1 | * | 11/2004 | Nguyen et al. ............. 358/1.15 |
| 6,845,396 | B1 | * | 1/2005 | Kanojia et al. ............. 709/220 |
| 6,854,009 | B1 | * | 2/2005 | Hughes ....................... 709/220 |
| 6,877,037 | B1 | * | 4/2005 | Adachi ....................... 709/227 |
| 6,892,381 | B2 | * | 5/2005 | Kim et al. .................. 717/171 |
| 6,904,449 | B1 | * | 6/2005 | Quinones ................... 709/203 |
| 6,910,128 | B1 | * | 6/2005 | Skibbie et al. .............. 713/170 |
| 6,915,337 | B1 | * | 7/2005 | Motoyama et al. ......... 709/220 |
| 6,915,514 | B1 | * | 7/2005 | Machida ..................... 717/174 |
| 6,920,506 | B2 | * | 7/2005 | Barnard et al. ............. 709/245 |
| 6,920,631 | B2 | * | 7/2005 | Delo ........................... 717/174 |
| 6,947,967 | B2 | * | 9/2005 | Ferris et al. ................. 709/203 |
| 6,983,315 | B1 | * | 1/2006 | Crutcher ..................... 709/220 |
| 6,986,133 | B2 | * | 1/2006 | O'Brien et al. ............. 717/173 |
| 6,993,643 | B2 | * | 1/2006 | Powell ........................... 713/1 |
| 7,085,841 | B2 | * | 8/2006 | Edwards et al. ............ 709/230 |
| 7,149,789 | B2 | * | 12/2006 | Slivka et al. ............... 709/219 |
| 7,181,731 | B2 | * | 2/2007 | Pace et al. .................. 717/136 |
| 7,188,183 | B1 | * | 3/2007 | Paul et al. .................. 709/229 |
| 2001/0014958 | A1 | * | 8/2001 | Yamauchi et al. ............ 714/38 |
| 2002/0032754 | A1 | * | 3/2002 | Logston et al. ............. 709/219 |
| 2002/0065872 | A1 | * | 5/2002 | Genske et al. .............. 709/202 |
| 2002/0069263 | A1 | * | 6/2002 | Sears et al. ................. 709/218 |
| 2002/0078142 | A1 | * | 6/2002 | Moore et al. ............... 709/203 |
| 2003/0014515 | A1 | * | 1/2003 | Motoyama et al. ......... 709/224 |
| 2003/0030664 | A1 | * | 2/2003 | Parry .......................... 345/744 |
| 2003/0065744 | A1 | * | 4/2003 | Lam et al. .................. 709/219 |
| 2003/0065755 | A1 | * | 4/2003 | Gunji ......................... 709/221 |
| 2003/0066066 | A1 | * | 4/2003 | Nguyen et al. ............. 717/178 |
| 2003/0105888 | A1 | * | 6/2003 | Connelly et al. ........... 709/331 |
| 2003/0163602 | A1 | * | 8/2003 | Johnson et al. ............. 709/328 |
| 2004/0015947 | A1 | * | 1/2004 | Gong et al. ................. 717/170 |

FOREIGN PATENT DOCUMENTS

| | | | |
|---|---|---|---|
| JP | 08106377 | A * | 4/1996 |
| JP | 10-164115 | | 6/1998 |
| JP | 10-301884 | | 11/1998 |
| JP | 11-203087 | | 7/1999 |
| JP | 2000311120 | A * | 11/2000 |
| JP | 2000-353079 | | 12/2000 |
| JP | 2001-117834 | | 4/2001 |
| JP | 2001154951 | A * | 6/2001 |

OTHER PUBLICATIONS

Stewart, B. "Definitions of Managed Objects for Parallel-printer-like Hardware Devices using SMIv2," RFC 1660, Jul. 1994, pp. 1-10.*

Smith, R. et al. "Printer MIB," RFC 1759, Mar. 1995, pp. 1-113.*

Notification of Reasons for Refusal of Japanese Patent Application No. 2001-370882, mailed Jan. 10, 2006.

Decision of Refusal of Japanese Patent Application No. 2001-370882, mailed Sep. 26, 2006.

* cited by examiner

FIG.11

SOFTWARE LIST

SOFTWARE LIST — 81

| | SOFTWARE NAME | VERSION | DESCRIPTION |
|---|---|---|---|
| ☑ | Port Monitor | V1, 2, D | PRINT DATA TRANSFER PROGRAM |
| ☑ | Printer Driver A | V1, 3, D | PRINTER DRIVER FOR MODEL A |

82

[NEXT>>] — 83

DEVICE INFORMATION ACQUIRING METHOD, SERVER APPARATUS AND COMPUTER-READABLE STORAGE MEDIUM

BACKGROUND OF THE INVENTION

This application claims the benefit of a Japanese Patent Application No. 2001-370882 filed Dec. 5, 2001, in the Japanese Patent office, the disclosure of which is hereby incorporated by reference.

1. Field of the Invention

The present invention generally relates to device information acquiring methods, server apparatuses and computer-readable storage media, and more particularly to a device information acquiring method for enabling a user to acquire, via a network, device information which is related to a device used by the user, a server apparatus for sending device information requested by the user via a network, and a computer-readable storage medium which stores a program for causing a computer to enable device information to be acquired by such a device information acquiring method.

In computer systems, various devices such as printers, display units and scanners are connected to one or a plurality of computers via a network such as a local area network (LAN). In order for a computer in the computer system to use the device connected to the network, the computer must be installed with a driver software for driving the device. For example, a printer driver for driving a desired printer must be installed in the computer in order for this computer to use the desired printer.

Each device can be identified by a model name or identification number of the device. Hence, if the computer is not yet installed with the printer driver for driving the desired printer, for example, the user must acquire the printer driver based on the model name or identification number of the desired printer. Similarly, if the printer driver for driving the desired printer is already installed in the computer but the user wishes to update the printer driver to a most updated version, for example, the user must acquire printer driver updating information based on the model name or identification number of the desired printer.

In this specification, the model name or identification number of the device, a device driver for driving the device, and device driver updating information for updating the device driver of the device will be referred to as "device information".

2. Description of the Related Art

For example, when using a printer by connecting the printer to a personal computer (PC), it is necessary to install a printer driver for driving the printer in the personal computer. Generally, the printer driver is recorded on a CD-ROM or the like, and is provided by a printer vendor together with the printer. In some cases, the printer driver is pre-installed within an operating system (OS) such as WINDOWS (registered trademark) which is used by the personal computer.

Improvements are constantly made, and thus, new versions of the same printer driver are constantly developed. Hence, the printer vendor often provides a Web site for accepting requests from the users to download a most recent version of the printer driver for various printer models.

Recently, LANs are often set up in offices, and a plurality of printers and a plurality of computers are connected to such a LAN, so that each computer may use one or more printers connected to the LAN, as long as the printer driver therefor is installed in the computer. The plurality of printers connected to the LAN are not identical in most cases, and different printer models are connected to the LAN. But if the computer is not installed with the printer driver for the desired printer which is to be used, the user must acquire the printer driver for the desired printer.

It is normally the case that a large number of printer models having similar printer model names or identification numbers are provided by the same printer vendor. Hence, for the general user, it requires a troublesome, time-consuming and often difficult task of checking which printer models can be used by the user's computer, and which printer models are provided by the printer vendor, when the user wishes to install the printer driver for the desired printer or to update the installed printer driver for the desired printer to the most recent version.

In addition, even after the user identifies the printer models usable by the user's computer and also identifies the printer vendor who provides the identified printer models, the user must then carry out the troublesome, time-consuming and often difficult task of selecting the correct printer driver or the correct printer driver updating information on the Web site of the identified printer vendor. On the Web site of the identified printer vendor, a large number of printer models and corresponding printer drivers are listed. But since the printer driver differs for each operating system (OS) with which the printer driver is to operate, a plurality of kinds of printer drivers are listed, one for each operating system (OS), even for the same printer model. Moreover, a large number of printer driver updating information is listed for each printer driver, including each kind of printer driver, from the oldest to the most recent version. Therefore, a large burden is put on the user to select the correct printer driver or the correct printer driver updating information from the extremely large amount of information provided on the Web site of the printer vendor.

On the other hand, a network communication environment setting system is proposed in a Japanese Laid-Open Patent Application No. 2001-117834. The proposed system acquires client information related to a computer (client) which is connected to a network, and searches for printers which are usable by the client. A specific printer is selected from the usable printers, and printer information of the specific printer is acquired so as to install a printer driver for the specific printer in the client, in order to facilitate the setting of a communication environment for the client.

However, the proposed system only vaguely describes the acquiring of the client information and the installing of the printer driver, and does not describe specific means or details of the client information acquisition and the printer driver installment. In other words, the prior art does not provide concrete means for easily acquiring the printer driver and the printer driver updating information from a Web site of a printer vendor.

SUMMARY OF THE INVENTION

Accordingly, it is a general object of the present invention to provide a novel and useful device information acquiring method, server apparatus and computer-readable storage medium, in which the problems described above are eliminated.

Another and more specific object of the present invention is to provide a device information acquiring method, a server apparatuses and a computer-readable storage medium, which enables a user easy access to device information which is required to use a desired device of the user.

Still another object of the present invention is to provide a device information acquiring method for acquiring device information related to devices from a Web site provided by a server apparatus via one or a plurality of networks, comprising the steps of (a) checking an environment of a client terminal from which the Web site is accessed, including at least one device usable by the client terminal, and sending environment information indicative of the environment to the server apparatus, (b) downloading device information of said at least one device, from the server apparatus to the client terminal, by a server execution program executed by the server apparatus, based on the environment information received from the client terminal, and (c) installing the downloaded device information in the client terminal. According to the device information acquiring method of the present invention, it is possible to enable a user easy access to the device information which is required to use a desired device of the user connected to the client terminal.

A further object of the present invention is to provide a server apparatus which manages device information related to devices used by client terminals and providing the device information requested from the client terminals via one or a plurality of networks, comprising a storage unit storing device information including most recent versions of data transfer programs and device drivers, and downloading means for downloading the device information of at least one device usable by an arbitrary client terminal and stored in said storage unit, from the server apparatus to the arbitrary client terminal, by a server execution program executed by the server apparatus, based on environment information indicative of an environment of the arbitrary client terminal received from the arbitrary client terminal and including information with respect to said at least one device, so that the arbitrary client terminal installs the downloaded device information therein. According to the server apparatus of the present invention, it is possible to enable a user easy access to the device information which is required to use a desired device of the user connected to the client terminal.

Another object of the present invention is to provide a computer-readable storage medium which stores a program for causing a server computer to manage device information related to devices used by client terminals and provide the device information requested from the client terminals via one or a plurality of networks, where said program comprises a managing procedure causing the server computer to manage information including most recent versions of data transfer programs and device drivers in a storage unit, and a downloading procedure causing the server computer to download the device information of at least one device usable by an arbitrary client terminal and stored in the storage unit, from the server computer to the arbitrary client terminal, by a server execution program executed by the server computer, based on environment information indicative of an environment of the arbitrary client terminal received from the arbitrary client terminal and including information with respect to said at least one device, so that the arbitrary client terminal installs the downloaded device information therein. According to the computer-readable storage medium of the present invention, it is possible to enable a user easy access to the device information which is required to use a desired device of the user connected to the client terminal.

Still another object of the present invention is to provide a device information acquiring method to be implemented on a computer, comprising downloading a client execution program from a server to a client terminal in response to a request from the client terminal; displaying at the client terminal a first list of devices usable by the client terminal by the client execution program; sending environment information of selected devices selected from the first list, where the environment information includes software information including software version information and operating system information of the client terminal to the server; sending a second list of optimum software for the selected devices from the server for display at the client terminal, based on a software database of a plurality of device models; downloading from the server selected optimum software information selected from the second list; and installing the downloaded optimum software information in the client terminal by the client execution program. According to the device information acquiring method of the present invention, it is possible to enable a user easy access to the device information which is required to use a desired device of the user connected to the client terminal.

Other objects and further features of the present invention will be apparent from the following detailed description when read in conjunction with the accompanying drawings.

BRIEF DESCRIPTION OF THE DRAWINGS

FIG. 11 is a diagram showing a display on the client terminal of the network system;

DESCRIPTION OF THE PREFERRED EMBODIMENTS

Figure 1:
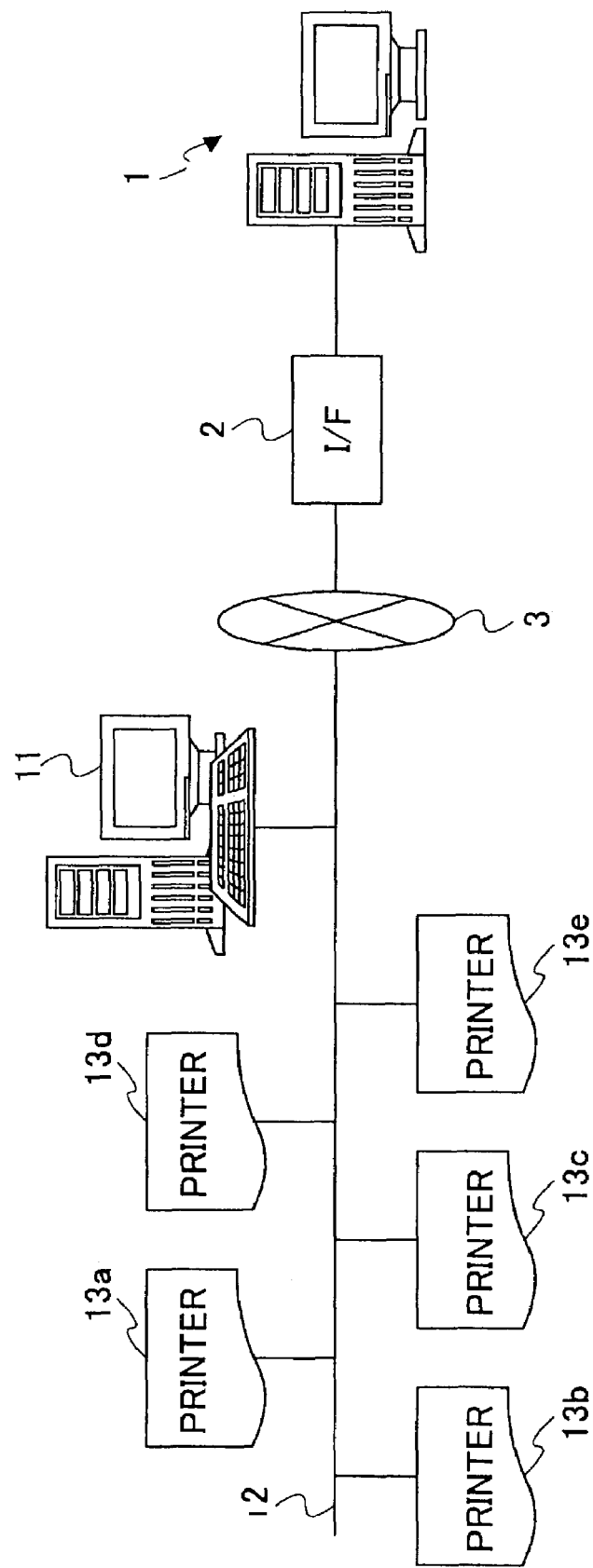
FIG. 1 is a diagram showing the general structure of a network system to which the present invention may be applied.

A description will be given of various embodiments of a device information acquiring method, a server apparatus and a computer-readable storage medium according to the present invention, by referring to the drawings.

In the following description, terms indicating standards and technologies developed by various companies are used, but such terms will not be identified as a trademark each time even when so.

FIG. 1 is a diagram showing the general structure of a network system to which embodiments of a device information acquiring method according to the present invention, a server apparatus according to the present invention and a computer-readable storage medium according to the present invention may be applied. In addition, FIG. 2 is a functional block diagram showing an important part of the network system shown in FIG. 1.

As shown in FIG. 1, a Web server 1, which forms an embodiment of the server apparatus according to the present invention, is connected to a network 3 such as the Internet via a predetermined communication interface 2. The Web server 1 manages a Web site of a device vendor A. The network 3 may be formed by one or a plurality of networks, including cable networks and/or wireless networks. A LAN 12 is connected to the network 3. A client terminal 11, and a plurality of devices such as printers 13a through 13e are connected to the LAN 12.

The printers 13a through 13c are three different printer models provided by the device vendor A, the printer 13d is a printer model provided by a device vendor B, and the printer 13e is a printer model provided by a device vendor C. For example, the client terminal 11 is formed by a known general purpose computer such as a personal computer, and includes an input device such as a keyboard and a mouse and a display unit. It is assumed for the sake of convenience that the printers 13a, 13b, 13c, 13d and 13erespectively have printer model names "a", "b", "c", "d" and "e".

Figure 2:
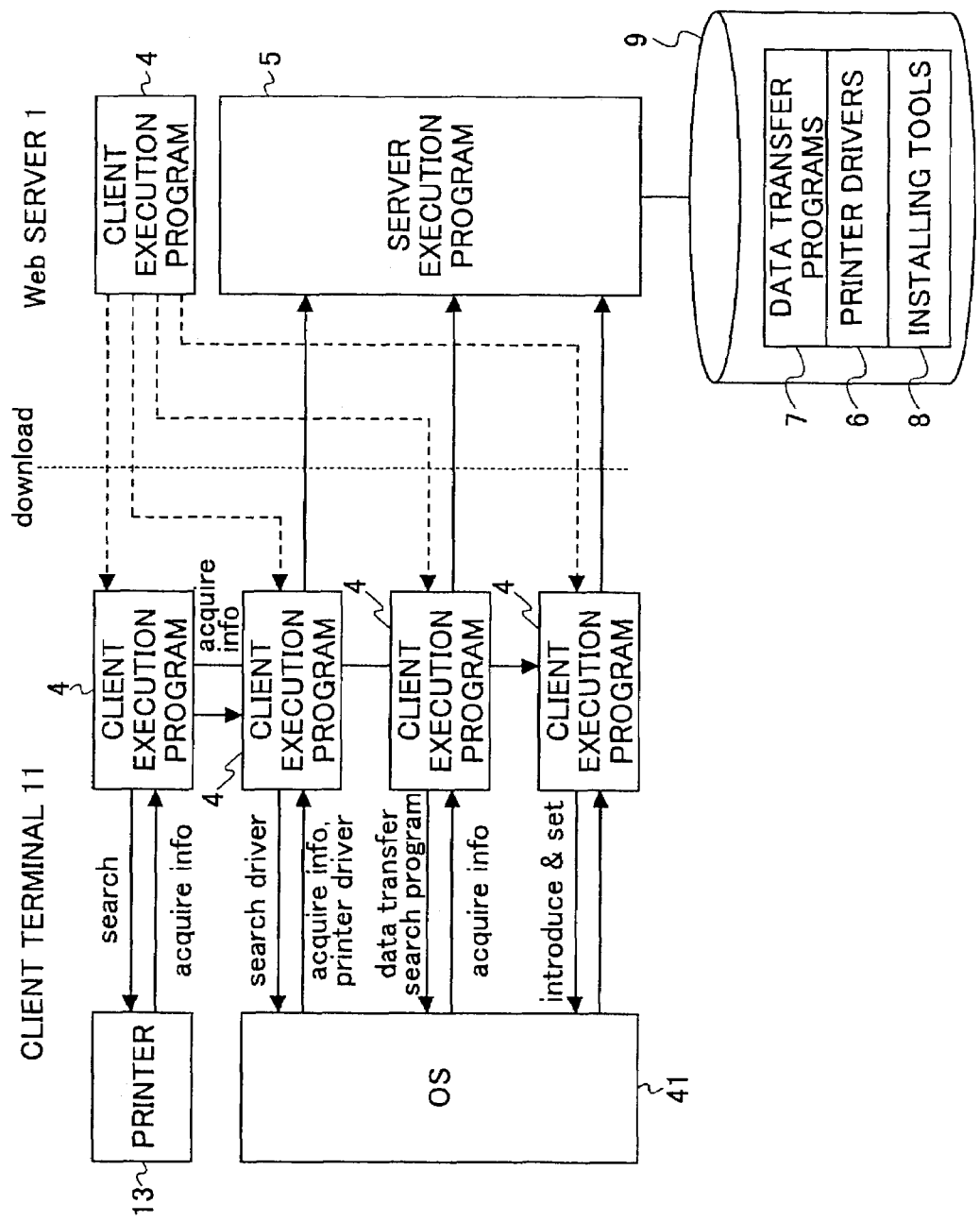
FIG. 2 is a functional block diagram showing an important part of the network system shown in FIG. 1.

As shown in FIG. 2, a server execution program 5 is provided in the Web server 1 and operates in the Web server 1. A storage unit 9 such as a hard disk drive is provided in or connected to the Web server 1, and stores a client execution program 4 which is sent to the client terminal 11 when requested. The storage unit 9 may be formed by first, second and third storages for respectively storing printer drivers 6, data transfer programs 7 and installing tools 8 which will be described later. In this embodiment, the storage unit 9 forms a software database of a plurality of device models of the printers.

Common Gateway Interface (CGI), Active Server Pages (ASP), Java Servlet and the like may be used as the server execution program 5. On the other hand, the client execution program 4 needs to be executed in the client terminal 11 after being downloaded. Hence, an Active X Control, a Java Applet and the like may be used as the client execution program 4. In the following description, it is assumed for the sake of convenience that the Java Servlet is used as the server execution program 5, and the Java Applet is used as the client execution program 4.

The client terminal 11 prints information on a selected printer 13 (one of the printers 13a through 13e) which is connected to the LAN 12, by the following process. That is, when a print instruction is issued by an application program which operates in the client terminal 11 which functions as a host unit with respect to the printer 13, a printer driver for driving the printer 13 creates print data. This printer driver operates with an operating system (OS) 41 of the client terminal 11. The printer driver transfers the created print data to the printer 13 having a specified address, so that the print data is printed on the printer 13.

As shown in FIG. 2, the storage unit 9 of the Web server 1 stores most recent versions of the printer drivers 6 for driving printers which have various model names and identification numbers (or serial numbers):and are provided by and supported by the device vendor A The printer drivers 6 are registered in a downloadable manner, for each printer model or identification number, and for each operating system (OS) used in the client terminals The storage unit 9 also stores the data transfer programs 7 for determining the ports for use in connecting the client terminals and the printers and enabling a data transfer between the client terminal and the printer, and the installing tools 8 for use in installing the printer drivers 6 in the client terminals. The storage unit 9 may also store, similarly to the printer drivers 6, printer driver updating information for use in updating the installed printer driver in the client terminal to a most recent version. Of course, the storage unit 9 may store device drivers other than the printer drivers 6, for driving devices other than printers, such as display units and scanners.

Figure 3:
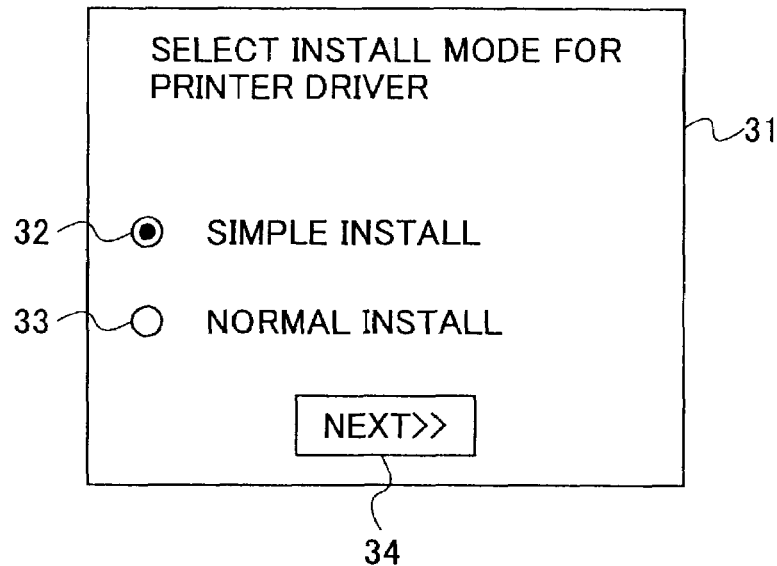
FIG. 3 is a diagram showing a page of a Web site displayed on a client terminal of the network system.

A description will now be given of a process of downloading the printer driver 6 from the Web server 1 into the client terminal 11. First, an application program of the client terminal 11, such as a browser, makes an access to a specific page 31 of the Web site provided by the Web server 1 which is managed by the device vendor A. As a result, the specific page 31 shown in FIG. 3 is displayed on the display unit of the client terminal 11. FIG. 3 is a diagram showing the page 31 of the Web site displayed on the client terminal 11 of the network system.

The displayed page 31 includes a button 32 for selecting a simple install mode, a button 33 for selecting a normal install mode, and a select button 34 for executing the selection made by the button 32 or 33 and advancing to a next page of the Web site. The buttons 32 through 34 may be selected by a known method using the keyboard or mouse of the client terminal 11.

When the user selects the buttons 33 and 34 in this order to select the normal install mode, the user thereafter searches the desired printer driver manually in the conventional manner by advancing to a page of the Web site for downloading the desired printer driver. More particularly, the user searches for the most recent version of the printer driver for driving the printer 13a or 13b or 13c provided by the device vendor A, which printer driver is adapted for the operating system (OS) 41 used by the client terminal 11.

Figure 4:
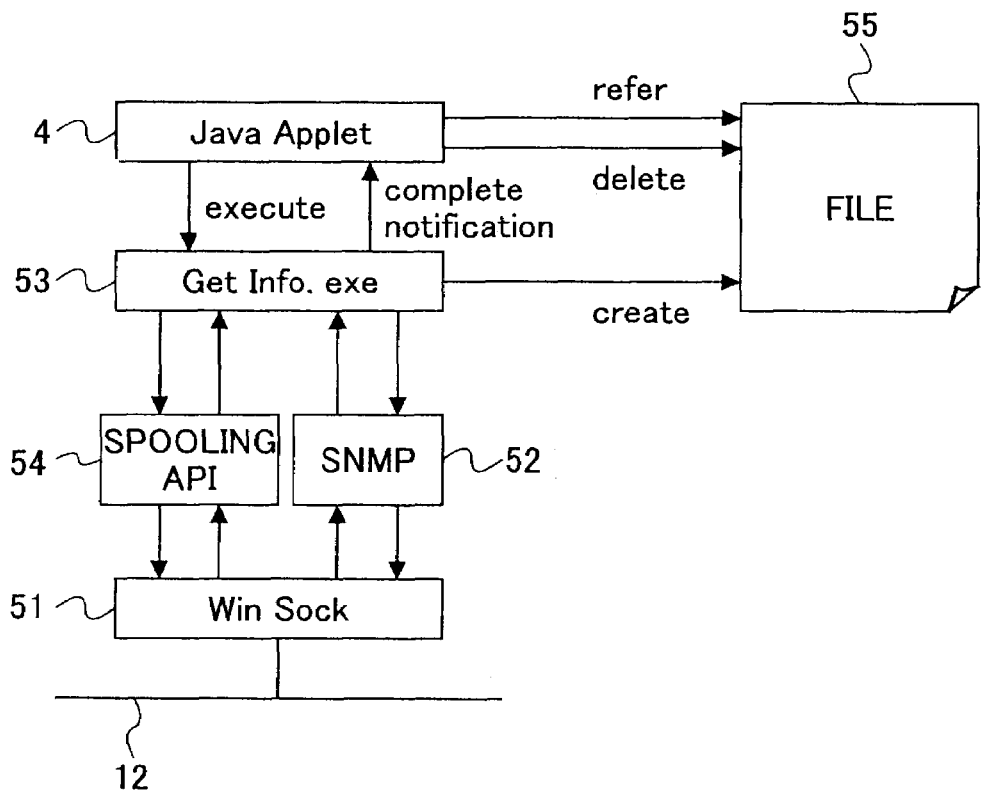
FIG. 4 is a functional block diagram showing a relationship of a client execution program and an operating system (OS) at the client terminal of the network system on a network level of a hierarchical structure.
Figure 5:
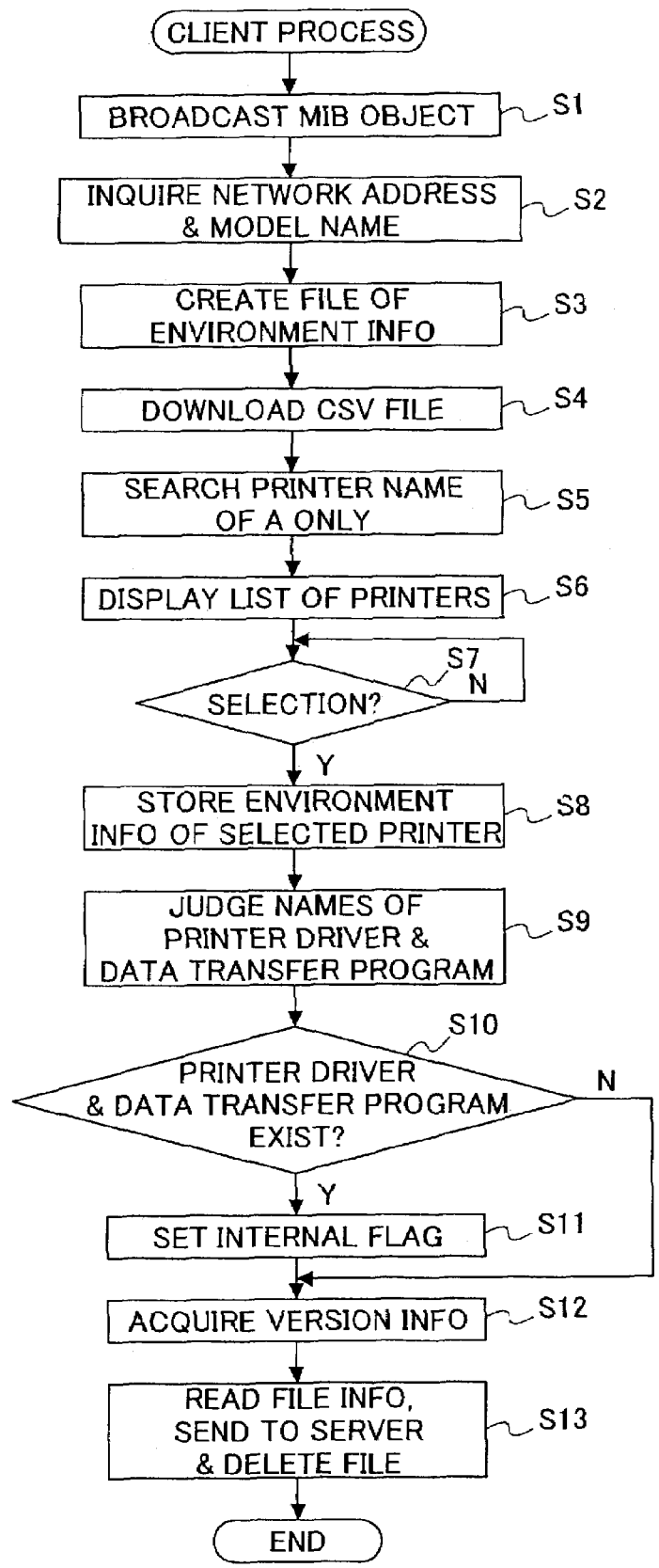
FIG. 5 is a flow chart for explaining a simple install process of the network system.
Figure 8:
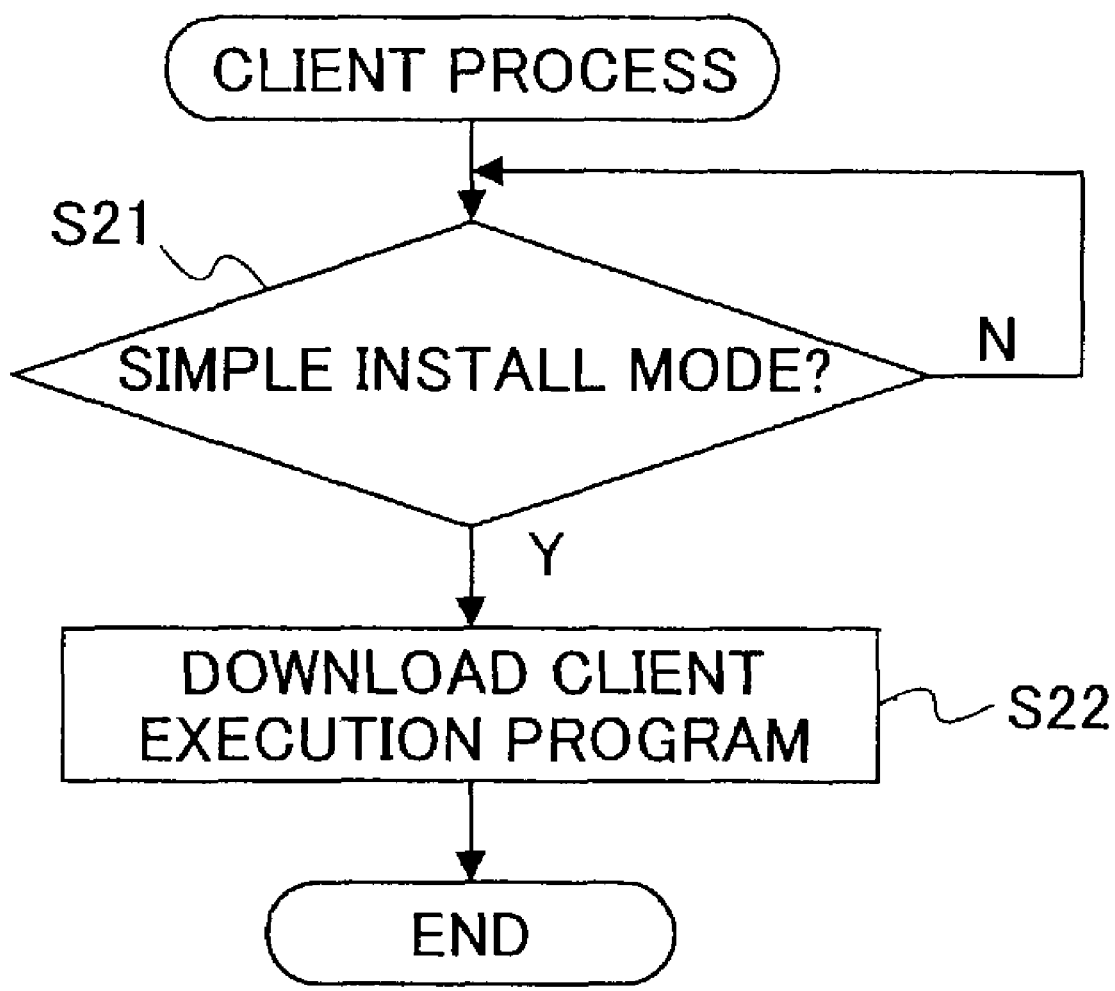
FIG. 8 is a flow chart for explaining a client process of the network system.

On the other hand, when the user selects the buttons 32 and 34 in this order to select the simple install mode, a simple install process is carried out as described in the following with reference to FIGS. 8, 4 and 5. FIG. 8 is a flow chart for explaining a client process of the network system. FIG. 4 is a functional block diagram showing a relationship of the client execution program 4 and the operating system (OS) 41 at the client terminal 11 of the network system on a network level of a hierarchical structure, and FIG. 5 is a flow chart for explaining the simple install process of the network system.

In FIG. 8, a step S21 decides whether or not the simple install mode is selected on the page 31 shown in FIG. 3. The process advances to a step S22 when the decision result in the step S21 becomes YES. The step S22 downloads the client execution program 4 from the Web server 1 into the client terminal 11. This step S22 realizes a client execution program sending means. When the client execution program 4 is downloaded into the client terminal 11 from the Web server 1, the downloaded client execution program 4 makes the following exchanges with the server execution program 5 of the Web server 1, the operating system (OS) 41 which operates in the client terminal 11, and the selected printer 13 connected to the LAN 12.

FIG. 4 shows a case where the client execution program 4 is the Java Applet, and the operating system (OS) 41 is the Windows Operating System. In the operating system (OS) 41, Windows Sockets 51 for making network communication is provided at a lowermost layer. Simple Network Management Protocol (SNMP) 52 and a spooling Application Program Interface (API) 54 are provided at an upper layer relative to the Windows Sockets 51. Further, EXE file (Get Info. exe) 53, which is a Windows application program, is provided at an upper layer relative to the SNMP 52. The client execution program (Java Applet) 4 is provided at an upper layer relative to the EXE file 53. The EXE file 53 is downloaded together with the client execution program 4.

Because of the nature of the program language Java, the Java Applet operates on any operating system (OS) as is well known. But for this reason, the Java Applet cannot carry out a process peculiar to a certain operating system (OS) such as Windows operating system (OS), and the Java Applet can only carry out processes which are common to, like greatest common measure of, the various operating systems (OSs). Hence, the EXE file 53 which is a Windows application is used so that the client execution program 4 which is a Java Applet causes the EXE file 53 to carry out a process peculiar to (or unique to) the Windows operating system (OS). The spooling API 54 provides an interface between the operating system (OS) 41 which is the Windows operating system (OS) and the EXE file 53 which is the Windows application. Even in a case where the operating system (OS) 41 of the client terminal 11 is other than the Windows operating system (OS), a certain application peculiar to the operating system (OS) may be used, by providing an interface by the client execution program 4 which is the Java Applet, so that the certain application can carry out a process peculiar to the operating system (OS), as described hereunder.

Steps S1 and S2 shown in FIG. 5 carry out an environment information acquiring process by the client execution program 4 to search for the printers 13 existing in the environment of the client terminal 11, via the EXE file 53, and to acquire the environment information of each of the searched printers 13. The environment information includes the device model (name), the identification number, the network address and the like of each printer 13. The network address may be an Internet Protocol (IP) address.

More particularly, the SNMP 52 shown in FIG. 4 is used as a search tool. In the step S1, the client execution program 4 uses the SNMP 52 via the EXE file 53, and broadcasts a specific Management Information Base (MIB) object to the LAN 12. As a result, it is possible to know the existence of one or more printers 13 which supports the specific MIB object. In the step S2, with respect to each printer 13 from which a response is received via the LAN 12 with respect to the broadcasting or the like, the client execution program 4 uses the SNMP 52 via the EXE file 53 to inquire the environment information of each printer 13 connected to the LAN 12, and to acquire the environment information of each printer 13 existing in the environment of the client terminal 11. In this particular case, the environment information of the printers 13a through 13e are acquired by the environment information acquiring process.

A step S3 carries out a file creating process. In other words, in the step S3, the client execution program 4 lists up the acquired environment information in a file format, via the EXE file 53. A file 55 shown in FIG. 4 is created by the file creating process.

As described above, the Java Applet can only carry out processes which are common to, like greatest common measure of, the various operating systems (OSs). Hence, the EXE file 53 which is a Windows application is used so that the client execution program 4 which is a Java Applet causes the EXE file 53 to carry out a process peculiar to (or unique to) the Windows operating system (OS). For this reason, the environment information acquiring process of the steps S1 and S2 acquires the environment information by using the SNMP 52 via the EXE file 53.

However, in order to process the acquired environment information by the client execution program 4 which is the Java Applet, the environment information cannot be read in a simple manner unless the environment information is in the file format. Accordingly, the file creating process of the step S3 lists up the acquired environment information in the file 55 via the EXE file 53. As a result, the client execution program 4 can read the environment information from the file 55 for use in subsequent processes, and can delete the file 55 when the file 55 is no longer required.

When the client execution program 4 makes a reference to the file 55, the environment information listed in the file 55 not only includes the environment information of the printers provided by the device vendor A, but also the environment information of the printers provided by the device vendors B and C. The environment information of the printers provided by the device vendor A and listed in the file 55 includes the environment information of the printers 13a through 13c in this particular case. Hence, the client execution program 4 accesses a predetermined Uniform Resource Locators (URL) of the Web server 1, and downloads a predetermined Comma Separated Value (CSV) file 61 shown in FIG. 6 to the client terminal 11, in a step S4 shown in FIG. 5.

Figure 6:
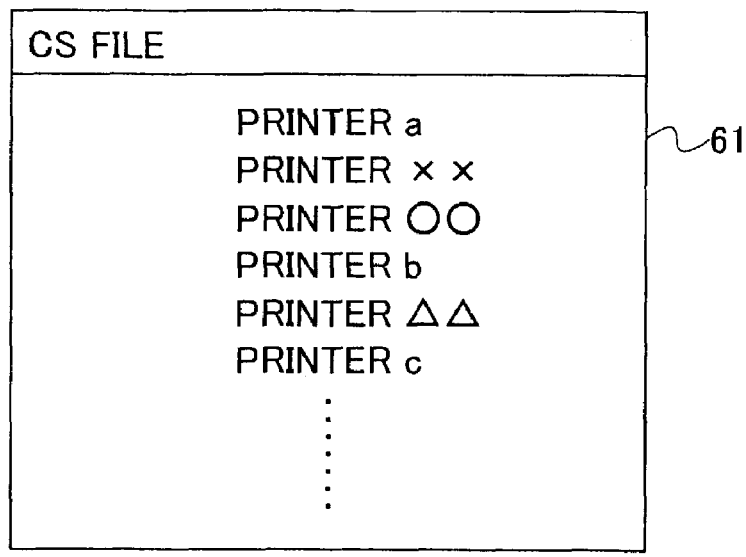
FIG. 6 is a diagram for explaining a CSV file used in the process of the network system.

FIG. 6 is a diagram showing the CSV file 61 used in the process of the network system. As shown in FIG. 6, the CSV file 61 lists the environment information (for example, model information such as the model name) of the printers provided by the device vendor A which are supported by the printer driver provided by the device vendor A. Hence, in a step S5 shown in FIG. 5, the client execution program 4 collates the environment information (for example, model name) listed in the file 55 and the environment information (for example, model name) listed in the CSV file 61, and searches from the CSV file 61 and outputs to the file 55 only the printer model which is listed in the file 55 and is supported by the device vendor A. In other words, a collating process is carried out by the step S5. As a result of this collating process, of the environment information of the printers 13a through 13c, only the environment information of the printers 13a and 13b which are listed in the CSV file 61 as being presently supported by the device vendor A is output to the file 55 in this particular case.

The step S2 may use as the MIB object a private MIB object which takes into consideration only the printers provided by the device vendor A. In this case, it is possible to omit the processes of the steps S4 and S5 by detecting the existence of the printer which supports the private MIB object, so that only the printers 13 presently supported by the device vendor A are directly detected.

Figure 7:
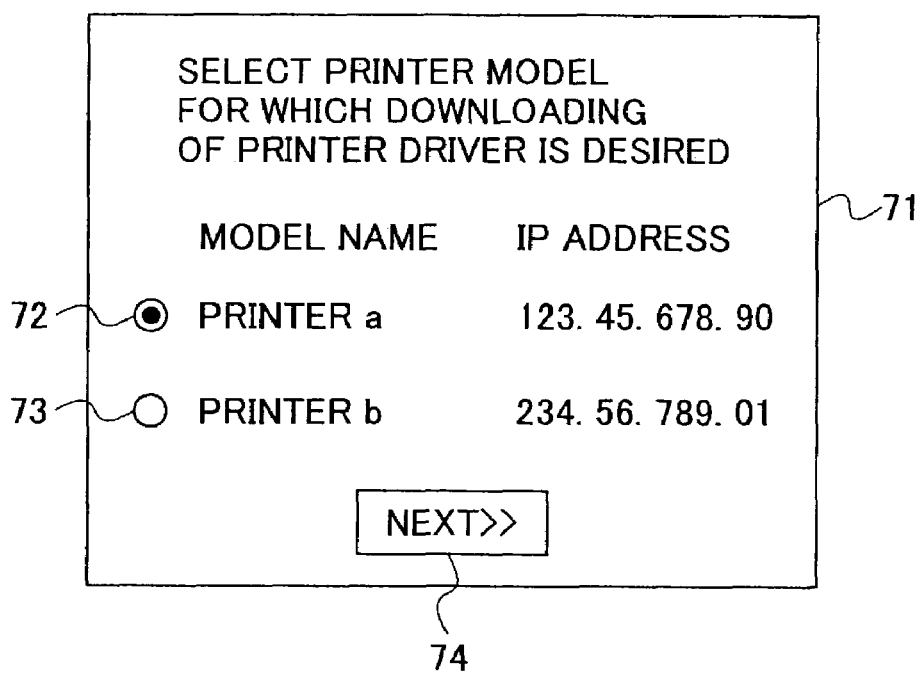
FIG. 7 is a diagram showing a display on the client terminal of the network system.

Next, in a step S6 shown in FIG. 5, the client execution program 4 displays a list of the printers 13a and 13b which are searched by the step S5 and listed in the file 55, on the display unit of the client terminal 11 in the form of a page 71 as shown in FIG. 7. FIG. 7 is a diagram showing the display on the client terminal 11 of the network system. Hence, the step S6 carries out an information display process. In this particular case, the displayed page 71 indicates the model name and the network address (IP address) of the printers 13a and 13b which are listed in the file 55 by the step S5. One of buttons 72 and 73 for selecting the printers 13a and 13b is selected. The button 72 is selected when downloading the printer driver for driving the printer 13a, and the button 73 is selected when downloading the printer driver for driving the printer 13b to the client terminal 11. A select button 74 is for executing the selection made by the button 72 or 73 and advancing to a next page of the Web site. The buttons 72 through 74 may be selected by a known method using the keyboard or mouse of the client terminal 11.

In a step S7 shown in FIG. 5, the client execution program 4 decides whether or not a selection is made on the page 71 shown in FIG. 7. If the decision result in the step S7 is YES, the client execution program 4 stores the environment information of the selected printer in a step S8. In this particular case, the buttons 72 and 74 are selected in this order, and the environment information of the printer 13a is stored in the step S8. The steps S7 and S8 carry out a environment information selecting process.

Figure 9:
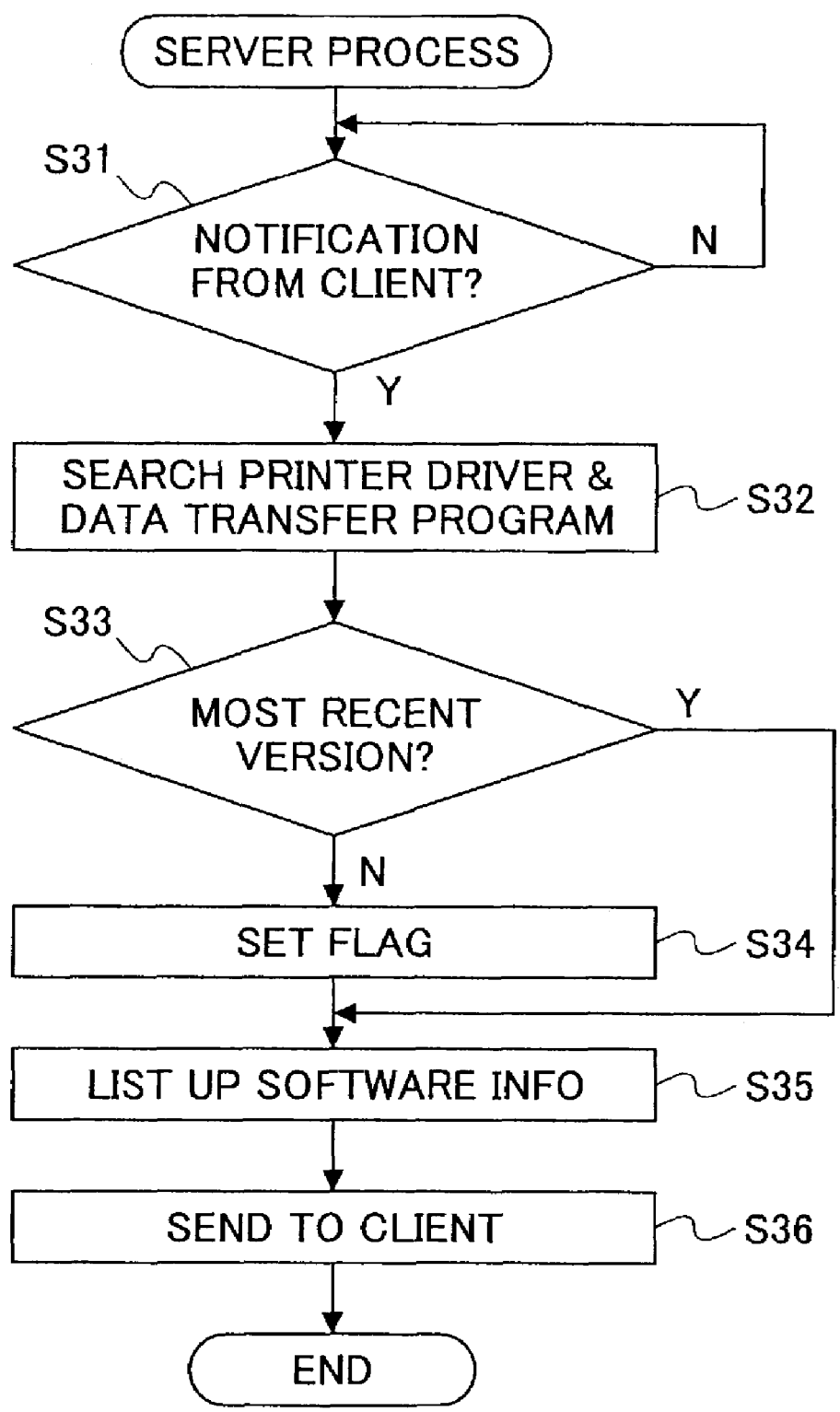
FIG. 9 is a flow chart for explaining a server process of the network system.

Next, in a step S9 shown in FIG. 9 shown in FIG. 5, the client execution program 4 judges the names of the printer driver and the data transfer program which are suited for the printer 13a, from the environment information of the printer 13a selected by the user. The judging method employed by the step S9 is not limited to a particular method. For example, the names of the printer driver and the data transfer program may be inferred from the model name of the printer 13a or, a relating table may be downloaded from the Web server 1 and looked up from the relating table.

In a step S10 shown in FIG. 5, the client execution program 4 searches within the client terminal 11 to check the existence of predetermined data transfer programs, and to decide whether or not the printer driver and the data transfer program the names of which are judged in the step S9 exist in the operating system (OS) 41 or the like. For example, in the Windows operating system (OS) environment, the process of the step S10 may be carried out by the client execution program 4 to check the registry using the spooling API via the EXE file 53. In addition, it is possible to carry out the process of the step S10 by using an interface which is provided by the data transfer program itself.

If the printer driver and the data transfer program do not exist in the client terminal 11 and the decision result in the step S10 is NO, the process advances to a step S11. In the step S11, the EXE file 53 sets in the file 55 an internal flag which indicates that the printer driver and the data transfer program are to be downloaded, and the process advances to a step S12. On the other hand, if the printer driver and the data transfer program exist in the client terminal 11 and the decision result in the step S10 is YES, the process advances to the step S12. In the step S12, version information of the printer driver and the data transfer program is acquired and the EXE file 53 additionally writes the acquired version information in the file 55. Hence, the step S12 carries out a version information acquiring process. When this version information acquiring process is completed, the EXE file 53 notifies the completion of the version information acquiring process to the client execution program 4, and the series of processes described above end.

In a step S13 shown in FIG. 5, the client execution program 4 acquires recorded information by referring to the file 55 in response to the completion notification regarding the version information acquiring process. In addition, in the step S13, the client execution program 4 deletes the file 55 which is no longer required, and sends the recorded information which is read from the file 55 to the Web server 1. Thus, the step S13 carries out an environment information returning process and a file deleting process When carrying out the environment information returning process and the file deleting process, information related to the type, language and the like of the operating system (OS) 41 may be sent to the Web server 1, so as to absorb the dependency of the printer driver on the operating system (OS) 41. Alternatively, a program dependent on the language used by the operating system (OS) 41 may be automatically acquired from the Web server 1. After the step S13, the process of the client terminal 11 ends, and the client terminal 11 waits until a notification is received from the Web server 1.

FIG. 9 is a flow chart for explaining a server process of the network system. In a step S31 shown in FIG. 8, the Web server 1 decides whether or not a notification is received from the client terminal 11. The step S31 carries out an environment information receiving process and a version information receiving process. If the decision result in the step S31 is YES, a step S32 searches the printer drivers 6 and the data transfer programs 7 registered in the storage unit 9 shown in FIG. 2. The step S32 carries out a software judging process.

A step S33 decides whether or not the versions of the printer driver and the data transfer program existing in the client terminal 11 are most recent versions, based on the search made in the step S32. If the version of at least one of the printer driver of the printer 13a and the data transfer program installed in the client terminal 11 is not the most recent version and the decision result in the step S33 is NO, a step S34 sets a flag which indicates that the printer driver and/or the data transfer program need to be updated.

Conventionally, the user himself must search on the Web site and judge whether or not the version of the printer driver for driving the user's printer requires updating to the most recent version. However, such a troublesome and time-consuming operation is not required by the user in this embodiment, because the Web server 1 will do the necessary searching and judging for the user.

Of course, the necessary searching and judging may be carried out by the client execution program 4 of the client terminal 11, instead of being carried out by the Web server 1. The necessary searching and judging may be carried out with ease particularly when the client terminal 11 is a relatively high-performance computer. However, in order to minimize the amount of data to be downloaded to the client terminal 11 from the Web server 1, it is desirable to carry out the necessary searching and judging in the Web server 1.

Next, the process shown in FIG. 9 advances to a step S35 after the step S34 or, if the decision result in the step S33 is YES. In the step S35, the server execution program 5 lists up more detailed software information, such as the program name and the version (or version number), with respect to the most recent version of the data transfer program 7 and the printer driver 6 required for the printer 13a, by searching the registered information in the storage unit 9. The software information includes the URL indicating a storage location for the data transfer program 7 and the printer driver 6 in the Web server 1. Then, in a step S36, a client execution program 4 of a new module is sent to the client terminal 11 together with the detailed software information that is listed up. The step S36 carries out a software information sending process.

Figure 10:
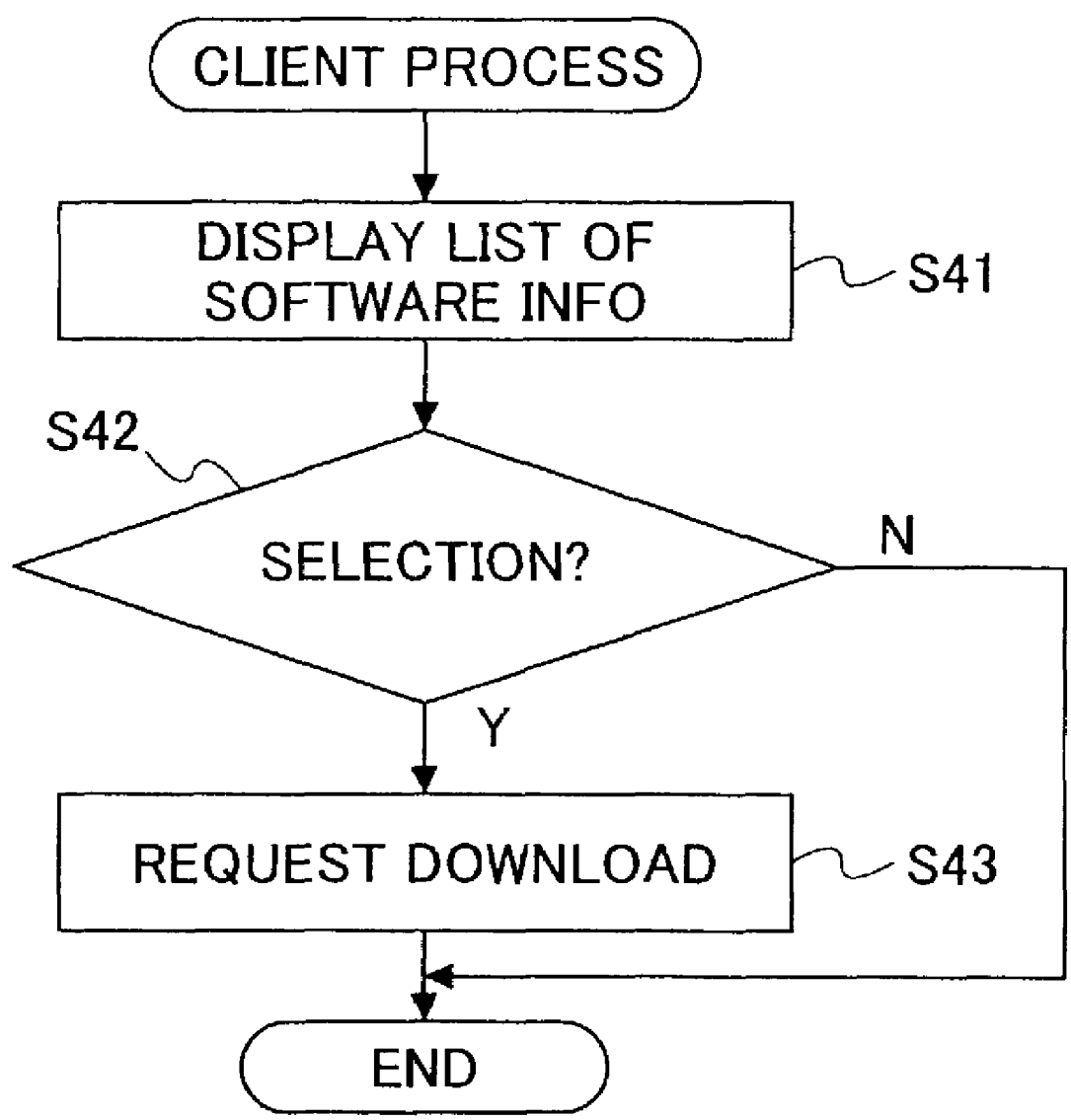
FIG. 10 is a flow chart for explaining a client process of the network system.

FIG. 10 is a flow chart for explaining a client process of the network system. The client process shown in FIG. 10 is carried out in response to the client execution program 4 of the new module which is received from the Web server 1 together with the detailed software information due to the software information sending process carried out by the step S36 shown in FIG. 9. In a step S41, the client terminal 11 displays on the display unit thereof a list of the software information related to the data transfer program 7 and the printer driver 6 received from the Web server 1, depending on the client execution program 4 of the new module received from the Web server 1. The step S41 carries out a software information displaying process.

FIG. 11 is a diagram showing a page 81 which is displayed by the software information displaying process of the step S41 on the display unit of the client terminal 11 in the network system. FIG. 11 shows a case where the software name, version, and description are displayed on the page 81 with respect to the data transfer program 7 and the printer driver 6. A button 82 is displayed with respect to each software name, so that the final downloading of the data transfer program 7 and the printer driver 6 may be decided by the user, by selecting the appropriate button or buttons 82. The selection made by the button or buttons 82 is executed when the user selects a select button 83. The buttons 82 through 83 may be selected by a known method using the keyboard or mouse of the client terminal 11. Of course, it is not essential to enable the user to make the decision regarding the final downloading of the data transfer program 7 and the printer driver 6, and the buttons 82 may be omitted.

In a step S42 shown in FIG. 10, the client execution program 4 decides whether or not the select button 83 on the page 81 is selected. If the decision result in the step S42 is YES, the client execution program 4 requests to the Web server 1 the downloading of the data transfer program 7, the printer driver 6 and the like by specifying the URL. The process ends if the decision result in the step S42 is NO or after the step S43.

Figure 12:
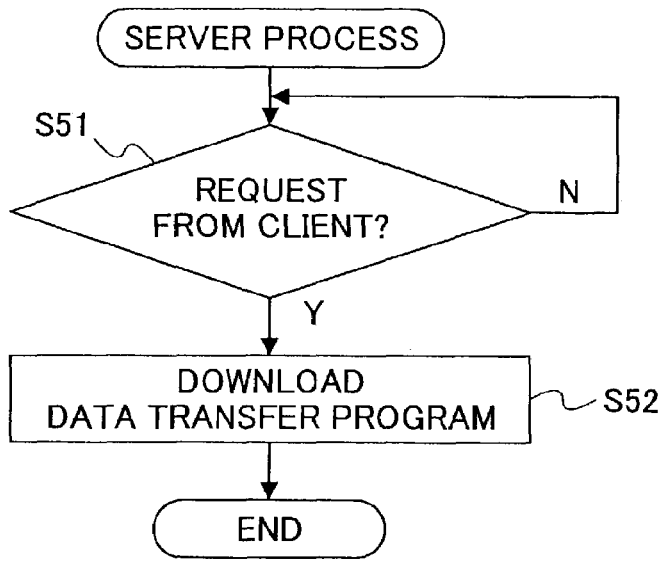
FIG. 12 is a flow chart for explaining a server process of the network system.

FIG. 12 is a flow chart for explaining a server process of the network system. The server process shown in FIG. 12 is carried out in response to the download request from the client terminal 11 made by the step S43 shown in FIG. 10. In a step S51, the Web server 1 decides whether or not the download request is received from the client terminal 11. If the decision result in the step S51 is YES, the Web server 1 refers to the URL specified within the download request, and downloads the data transfer program 7 in a step S52. The information registered at the Web site may be compressed, and in this case, an expansion software may be additionally downloaded to the client terminal 11 from the Web server 1 after the downloading of the data transfer program 7 is completed. Further, the installing tool 8 is also downloaded to the client terminal 11 from the Web server 1, so that the client terminal 11 may install the downloaded data transfer program 7 using the installing tool 8. The step S51 carries out a download request receiving process, and the step S52 carries out a download executing process.

Figure 13:
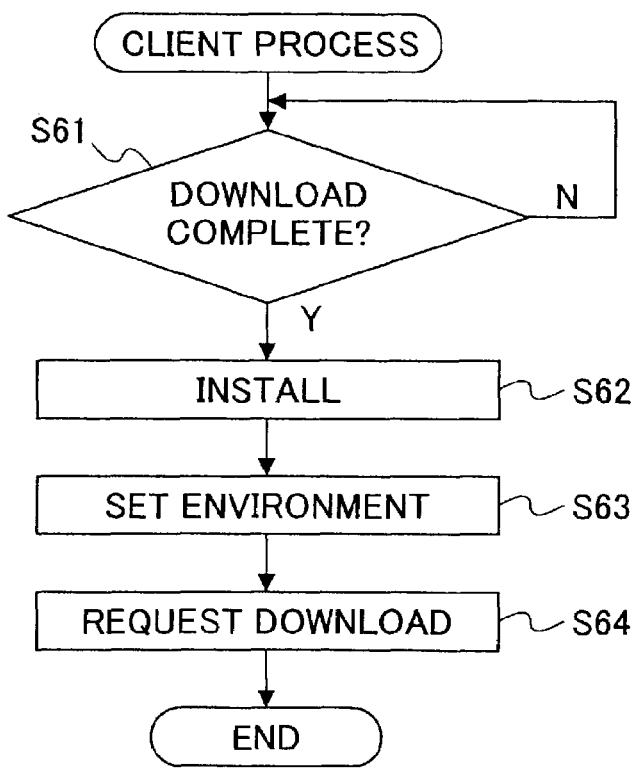
FIG. 13 is a flow chart for explaining a client process of the network system.

FIG. 13 is a flow chart for explaining a client process of the network system. The client process shown in FIG. 13 is carried out in response to the downloading of the data transfer program 7 made by the download executing process of the step S52 shown in FIG. 12. In a step S61, the client terminal 11 decides whether or not the downloading of the data transfer program 7 is completed. If the decision result in the step S61 is YES, the client terminal 11 starts the downloaded installing tool 8 and installs the downloaded data transfer program 7. Hence, the step S61 carries out a download receiving process, and the step S62 carries out an installing process.

After the data transfer program 7 is installed by the step S62, the client terminal 11 sets an environment for enabling output of the network address of the printer 13a in a step S63, so as to output print data to the printer 13a via the LAN 12. Hence, the step S63 carries out an environment setting process. In the Windows operating system (OS) environment, the output port is created by this step S63. Then, the client terminal 11 requests downloading of the printer driver 6 with respect to the Web server 1 in a step S64. In response to this download, request, the Web server 1 sends the printer driver 6 to the client terminal 11, and the client terminal 11 installs the downloaded printer driver 6 using the installing tool 8. The process of the client terminal 11 ends after the step S64.

In other words, the server process in this case is similar to that shown in FIG. 12. The Web server 1 decides whether or not the download request is received from the client terminal 11, similarly to the step S51. If the decision result is YES, the Web server 1 refers to the URL specified within the download request, and downloads the printer driver 6, similarly to the step S52. Further, the installing tool 8 is also downloaded to the client terminal 11 from the Web server 1, so that the client terminal 11 may install the downloaded printer driver 6 using the installing tool 8. Therefore, the downloaded printer driver 6 is installed into the client terminal 11 using the downloaded installing tool 8, by relating the printer driver 6 to the port which is already set as described above for outputting the print data.

Figure 14:
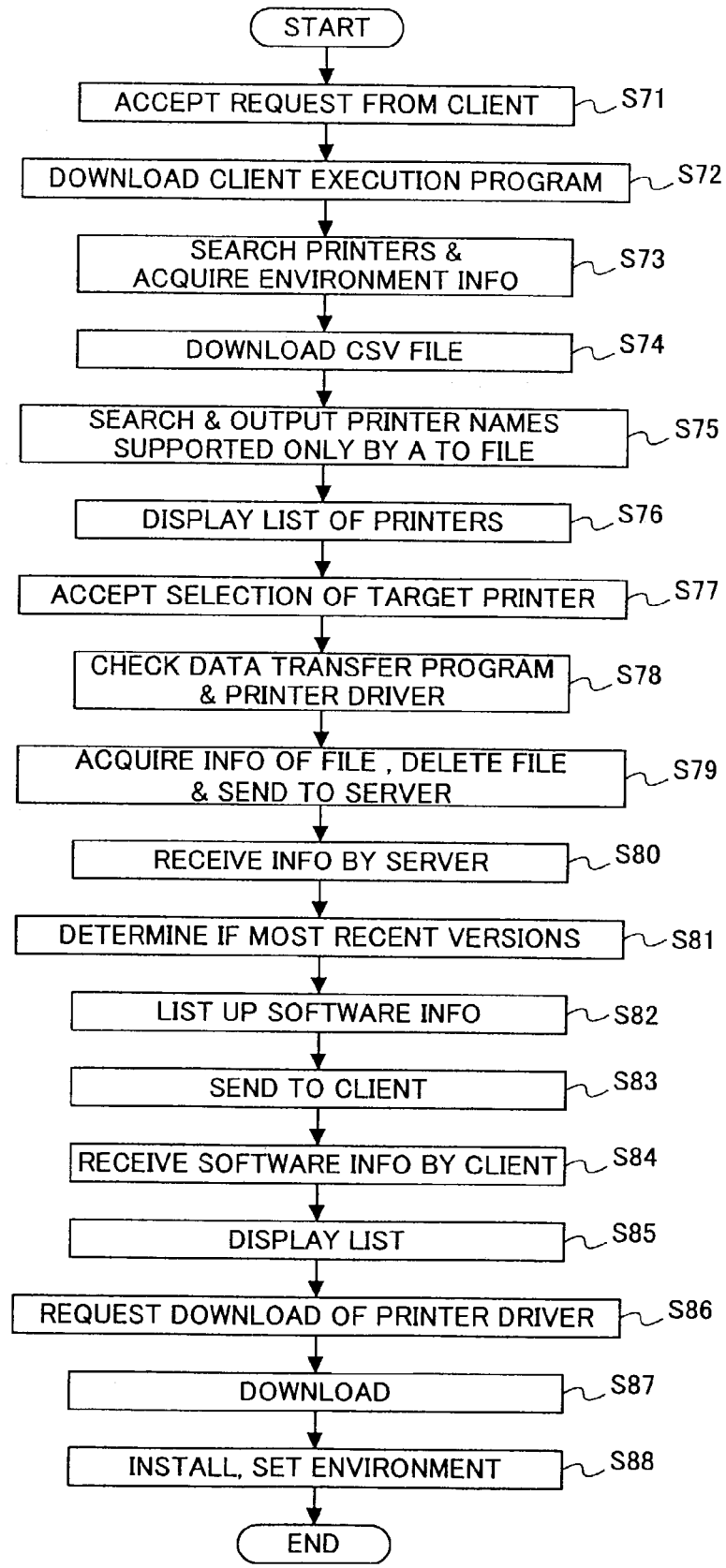
FIG. 14 is a flow chart for explaining a series of processes carried out by a Web server and the client terminal in the network system.

FIG. 14 is a flow chart for explaining the series of processes carried out by the Web server 1 and the client terminal 11 in the network system.

In FIG. 14, when the simple install mode is selected by the user and the simple install mode is requested from the client terminal 11, the Web server 1 accepts this request in a step S71, and downloads the client execution program 4 to the client terminal 11 in a step S72. The step S71 carries out the request accepting process, and the step S72 carries out the client execution program sending process.

The client terminal 11 which receives the client execution program 4 searches for the printers 13 existing in the environment of the client terminal 11, acquires the environment information and creates a file of the device information in a step S73. In this file, the acquired environment information is listed up in a file format. The step S73 carries out the environment information acquiring process and the file creating process. The CSV file 61 is downloaded to the client terminal 11 in a step S74. The file 55 and the CSV file 61 are collated, and only the printer name of the printer supported by the device vendor A are searched and output in a step S75. The step S75 carries out the collating process.

Next, a list of the searched printers 13 listed in the file 55 is displayed on the display unit of the client terminal 11 in a step S76. The step S76 carries out the environment information displaying process. In response to the selection of the button 72 or 73 and the selection button 74 on the page 71 shown in FIG. 7, the selection of the target printer 13 for which the printer driver is to be downloaded is accepted in a step S77. The step S77 carries out the environment information selecting process, the environment information returning process and the environment information receiving process.

A search is made within the client terminal 11 to determine the existence of a predetermined data transfer program and a printer driver having a printer driver name which is suited for the target printer 13, in a step S78. In addition, if the predetermined data transfer program and the printer driver exist in the client terminal 11, version information of the predetermined data transfer program and the printer driver is acquired and output to the file 55 in the step S78. The step S78 carries out the version information acquiring process. The client execution program 4 refers to the file 55 which is created in the above described manner to acquire the recorded information, deletes the file 55 which becomes unnecessary, and sends the information read from the file 55 to the Web server 1, in a step S79. The step S79 carries out the file deleting process, the environment information returning process, the version information returning process and the file deleting process.

The Web server 1 receives the information set from the client terminal 11, in a step S80. In addition, the Web server 1 searches the printer drivers 6 and the data transfer programs 7 registered in the storage unit 9, to determine whether the versions of the printer driver and the data transfer program existing in the client terminal 11 are the most recent versions, in a step S81. The step S80 carries out the environment information receiving process and the version information receiving process. The step S81 carries out the software judging process.

If the versions of the printer driver and the data transfer program existing in the client terminal 11 are not the most recent versions, the Web server 1 searches within the storage unit 9 to find the most recent versions of the printer driver and the data transfer program required for the target printer 13, and lists up detailed software information thereof in a step S82. The Web server 1 sends the detailed software information to the client terminal 11, in a step S83. The step S83 carries out the software information sending process.

The client terminal 11 receives the detailed software information from the Web server 1 in a step S84, and displays the received information related to the data transfer program and the printer driver on the display unit of the client terminal 11 in a step S85. The page 81 shown in FIG. 11 is displayed by the step S85. The step S84 carries out the software information receiving process, and the step S85 carries out the software information displaying process. When the user selects the button 82 on the displayed page 85, the client terminal 11 specifies the URL and makes a download request to the Web server 1 requesting the downloading of the data transfer program, the printer driver and the like in a step S86.

The Web server 1 receives the request from the client terminal 11, and downloads the data transfer program 7, the printer driver 6 and the installing tool 8 which are read from the storage unit 9 to the client terminal 11 in a step S87. The client terminal 11 installs and sets the environment of the data transfer program 7 and the printer driver 6 using the installing tool 8 in a step S88, and the process ends.

The list displayed by the step S76 may be deleted after the recorded information of the file 55 is sent to the Web server 1. Similarly, the list displayed by the step S85 may be deleted after the downloading of the step S87, before the process shown in FIG. 14 ends, such as after the step S88, for example. Further, the client execution program 4 may be deleted before the process shown in FIG. 14 ends, such as after the step S88, for example.

Figure 15:
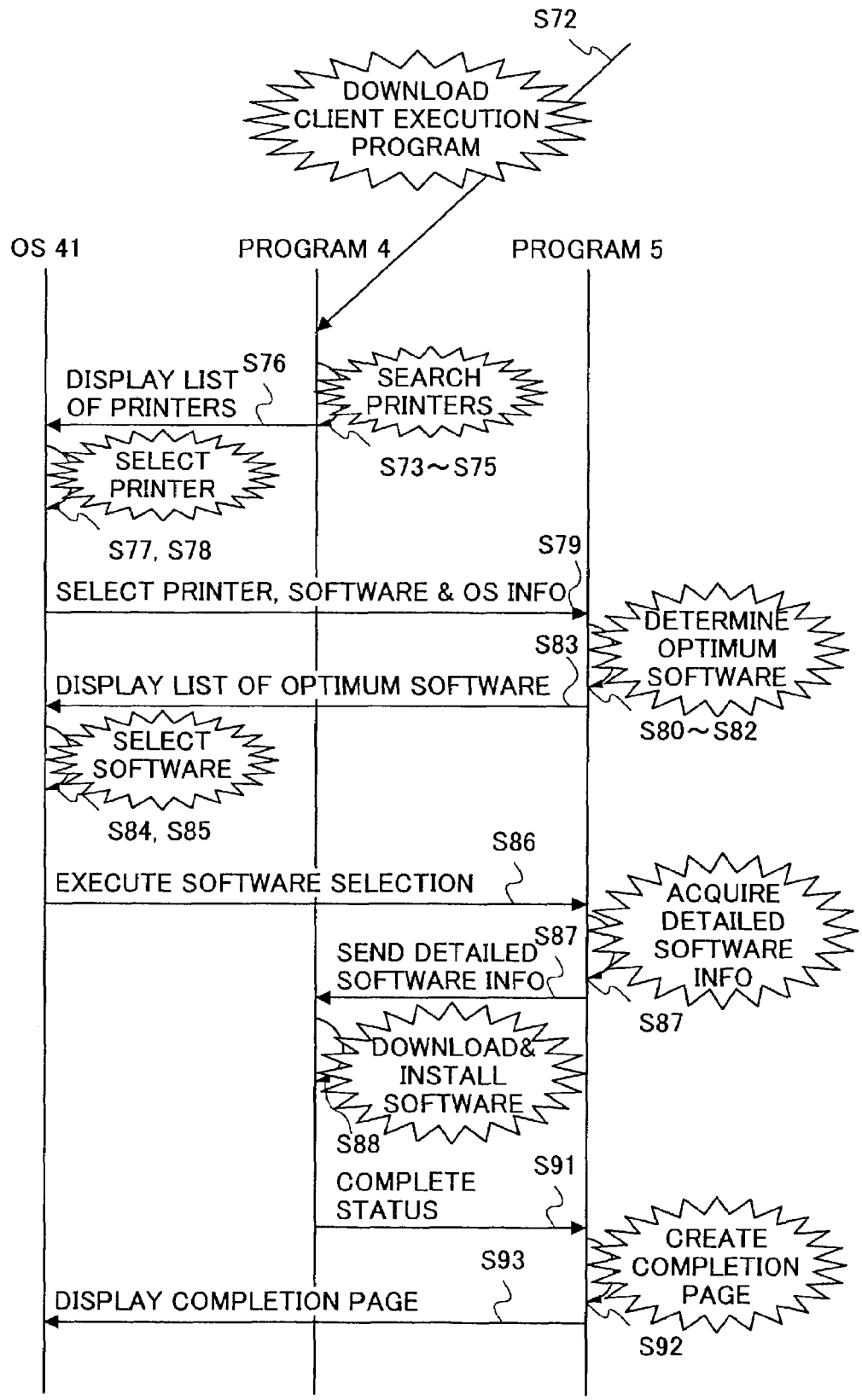
FIG. 15 is a time chart for explaining the basic operation of the present invention.

FIG. 15 is a time chart for explaining the basic operation of the present invention. FIG. 15 shows the basic operation of the present invention in terms of the operating system (OS) 41 of the client terminal 11, the client execution program 4 downloaded from the Web server 1, and the server execution program 5 of the Web server 1. In FIG. 15, those steps which are essentially the same as the corresponding steps in FIG. 14 are designated by the same reference numerals, and a description thereof will be omitted.

In FIG. 15, the recorded information of the file 55 includes the environment information of the selected printer 13, including software information related to the client terminal 11, such as the software version and the operating system (OS) 41 of the client terminal 11. Hence, the steps S80 through S82 determine a list of optimum device information for the selected printer 13, including the software version and the operating system (OS) 41 used by the client terminal 11. As a result, the step S88 installs the optimum device information (printer driver 6 and the data transfer program 7) for the selected printer 13 and for the software version and the operating system (OS) 41 used by the client terminal 11.

The client execution program 4 sends a complete status indicating a completion of the installing of the optimum device information in the client terminal 11, from the client terminal 11 to the server execution program 5 of the Web server 1, in a step S91. In response to the complete status, the server execution program 5 of the Web server 1 creates a completion page which indicates completion of the installing of the optimum device information in the client terminal 11, in a step S92. This completion page is sent by the server execution program 5 to the operating system (OS) 41, that is, from the Web server 1 to the client terminal 11, in a step S93. As a result, the completion page is displayed on the display unit of the client terminal 11.

In the case shown in FIG. 2, the above described process of the client terminal 11 is carried out by the client execution program 4 which is formed by a plurality of modules. However, in order to reduce the network traffic, it is of course possible to carry out the above described process of the client 11 by the client execution program 4 which is formed by a single module.

The printing system employed by the printers 13 is not limited to a particular printing system, and may be selected from the electrophotography printing system, ink-jet printing system, sublimation type thermal transfer printing system, silver halide diffusion transfer printing system, direct thermal printing system, melting type thermal transfer printing system and the like.

In addition, the devices connected to the LAN 12 shown in FIG. 1 are not limited to the printers 13, and may be other devices such as display units and scanners.

Of course, when the data transfer program and the device driver do not exist in the client terminal, the data transfer program and the device driver can be newly installed in the client terminal in a manner similar to updating versions of the data transfer program and the driver.

Further, the present invention is not limited to these embodiments, but various variations and modifications may be made without departing from the scope of the present invention.

What is claimed is:

1. A device information acquiring method for acquiring device information related to devices from a Web site provided by a server apparatus via one or a plurality of networks, comprising the steps of:

(a) checking an environment of a client terminal from which the Web site is accessed, including at least one device usable by the client terminal, and sending environment information indicative of the environment to the server apparatus;

(b) downloading device information of said at least one device, from the server apparatus to the client terminal, by a server execution program executed by the server apparatus, based on the environment information received from the client terminal; and (c) installing the downloaded device information in the client terminal, wherein said step (a) includes receiving a client execution program which is independent of an operating system of the client terminal, and an arbitrary program which is dependent of said operating system, that are downloaded together from the server apparatus to the client terminal in response to a request from the client terminal, and checking the environment of the client terminal by said client execution program via said arbitrary program.

2. The device information acquiring method as claimed in claim 1, wherein said step (a) includes:

sending the environment information from the client terminal to the server apparatus by executing the client execution program via said arbitrary program.

3. The device information acquiring method as claimed in claim 2, wherein said step (a) further includes:

displaying at the client terminal a list of the devices usable by the client terminal and provided by a device vendor managing the Web site; and sending the environment information from the client terminal to the server apparatus in response to a selection of said at least one device in the list at the client terminal by executing the client execution program via said arbitrary program.

4. The device information acquiring method as claimed in claim 2, wherein said step (a) further includes:

checking existence of a data transfer program and a device driver for said at least one device in the client terminal, and creating a file of environment information including version information related to the existing data transfer program and the device driver existing in the client terminal; and acquiring information included in the file and sending the acquired information of the file to the server apparatus.

5. The device information acquiring method as claimed in claim 4, wherein said step (a) further includes:

deleting the file when a predetermined condition is satisfied in the client terminal.

6. The device information acquiring method as claimed in claim 2, wherein the client execution program is selected from a group of programs consisting of Active X Control and Java Applet.

7. The device information acquiring method as claimed in claim 4, wherein said step (b) includes:

sending a list of most recent versions of the device driver and the data transfer program from the server apparatus to the client terminal and displaying the list if the information of the list received from the client terminal includes no most recent versions of the device driver and the data transfer program for said at least one device;

downloading the most recent versions of the device driver and the data transfer program for said at least one device from the server apparatus to the client terminal in response a download request made by a selection made from the list.

8. The device information acquiring method as claimed in claim 7, wherein said step (b) further includes:

downloading an installing tool for installing the most recent versions of the device driver and the data transfer program for said at least one device into the client terminal, from the server apparatus to the client terminal, together with the most recent versions of the device driver and the data transfer program, in response to the download request.

9. The device information acquiring method as claimed in claim 8, wherein said step (c) includes:

installing in the client terminal the most recent versions of the device driver and the data transfer program downloaded from the server apparatus, using the installing tool downloaded from the server apparatus.

10. The device information acquiring method as claimed in claim 1, wherein the devices are selected from a group consisting of printers, scanners and display units.

11. The device information acquiring method as claimed in claim 1, wherein the server apparatus manages most recent versions of data transfer programs and device drivers for a plurality of different device models, with respect to a plurality of different operating systems usable by the client terminal.

12. The device information acquiring method as claimed in claim 1, wherein the server execution program is selected from a group of programs consisting of Common Gateway Interface (CGI), Active Server Pages (ASP) and Java Servlet.

13. A server apparatus which manages device information related to devices used by client terminals and providing the device information requested from the client terminals via one or a plurality of networks, comprising:

a part configured to download, a client execution program which is independent of an operating system of an arbitrary client terminal, and an arbitrary program which is dependent of said operating system, said client execution program and said arbitrary program being downloaded together to the arbitrary client terminal in response to a request from the arbitrary client terminal, said client execution program being executed by the arbitrary client terminal to check and send environment information indicative of an environment of the arbitrary client terminal to the server apparatus via said arbitrary program;

a storage unit configured to store device information including most recent versions of data transfer programs and device drivers; and a downloading part configured to download the device information of at least one device usable by the arbitrary client terminal and stored in said storage unit, from the server apparatus to the arbitrary client terminal, by a server execution program executed by the server apparatus, based on the environment information received from the arbitrary client terminal and including information with respect to said at least one device, so that the arbitrary client terminal installs the downloaded device information therein.

14. The server apparatus as claimed in claim 13, wherein said downloading part comprises:

a part configured to send a list of most recent versions of a device driver and a data transfer program read from said storage unit to the arbitrary client terminal, and to display the list at the arbitrary client terminal if the device information received from the arbitrary client terminal includes no most recent versions of the device driver and the data transfer program for said at least one device; and a part configured to download the most recent versions of the device driver and the data transfer program for said at least one device to the arbitrary client terminal in response a download request made by a selection made from the list at the arbitrary client terminal.

15. The server apparatus as claimed in claim 14, wherein said downloading part further comprises:
a part configured to download an installing tool for installing the most recent versions of the device driver and the data transfer program for said at least one device into the arbitrary client terminal, together with the most recent versions of the device driver and the data transfer program, in response to the download request.

16. The server apparatus as claimed in claim 13, wherein the client execution program is selected from a group of programs consisting of Active X Control and Java Applet.

17. The server apparatus as claimed in claim 13, wherein the devices are selected from a group consisting of printers, scanners and display units.

18. The server apparatus as claimed in claim 13, wherein said storage unit stores most recent versions of data transfer programs and device drivers for a plurality of different device models, with respect to a plurality of different operating systems usable by the client terminal.

19. The server apparatus as claimed in claim 13, wherein the server execution program is selected from a group of programs consisting of Common Gateway Interface (CGI), Active Server Pages (ASP) and Java Servlet.

20. A computer-readable storage medium which stores a program for causing a server computer to manage device information related to devices used by client terminals and provide the device information requested from the client terminals via one or a plurality of networks, said program comprising:
a procedure causing the server computer to download, a client execution program which is independent of an operating system of an arbitrary client terminal, and an arbitrary program which is dependent of said operating system, said client execution program and said arbitrary program being downloaded together to the arbitrary client system in response to a request from the arbitrary client terminal, said client execution program being executed by the arbitrary client terminal to check and send environment information indicative of an environment of the arbitrary client terminal to the server computer via said arbitrary program;
a managing procedure causing the server computer to manage information including most recent versions of data transfer programs and device drivers in a storage unit; and
a downloading procedure causing the server computer to download the device information of at least one device usable by the arbitrary client terminal and stored in the storage unit, from the server computer to the arbitrary client terminal, by a server execution program executed by the server computer, based on the environment information received from the arbitrary client terminal and including information with respect to said at least one device, so that the arbitrary client terminal installs the downloaded device information therein.

21. The computer-readable storage medium as claimed in claim 20, wherein said downloading procedure includes:
a procedure causing the server computer to send a list of most recent versions of a device driver and a data transfer program read from the storage unit to the arbitrary client terminal and to display the list at the arbitrary client terminal if the device information received from the arbitrary client terminal includes no most recent versions of the device driver and the data transfer program for said at least one device; and
a procedure causing the server computer to download the most recent versions of the device driver and the data transfer program for said at least one device to the arbitrary client terminal in response a download request made by a selection made from the list at the arbitrary client terminal.

22. The computer-readable storage medium as claimed in claim 21, wherein said downloading procedure further includes:
a procedure causing the server computer to download an installing tool for installing the most recent versions of the device driver and the data transfer program for said at least one device into the arbitrary client terminal, together with the most recent versions of the device driver and the data transfer program, in response to the download request.

23. The computer-readable storage medium as claimed in claim 20, wherein the client execution program is selected from a group of programs consisting of Active X Control and Java Applet.

24. The computer-readable storage medium as claimed in claim 20, wherein the devices are selected from a group consisting of printers, scanners and display units.

25. The computer-readable storage medium as claimed in claim 20, wherein said managing procedure causes the server computer to store in the storage unit most recent versions of data transfer programs and device drivers for a plurality of different device models, with respect to a plurality of different operating systems usable by the client terminal.

26. The computer-readable storage medium as claimed in claim 20, wherein the server execution program is selected from a group of programs consisting of Common Gateway Interface (CGI), Active Server Pages (ASP) and Java Serviet.

27. A device information acquiring method to be implemented on a computer, comprising:
downloading a client execution program which is independent of an operating system of a client terminal and an arbitrary program which is dependent on the operating system from a server to the client terminal in response to a request from the client terminal, said client execution program and said arbitrary program being downloaded together,
displaying at the client terminal a first list of devices usable by the client terminal by the client execution program;
sending environment information of selected devices selected from the first list from the client terminal to the server by the client execution program via the arbitrary program, said environment information including software information which includes software version information and operating system information of the client terminal;
sending a second list of optimum software for the selected devices from the server for display at the client terminal, based on a software database of a plurality of device models;
downloading from the server to the client terminal selected optimum software information selected from the second list; and
installing the downloaded optimum software information in the client terminal by the client execution program.

28. The device information acquiring method as claimed in claim 27, further comprising:
deleting the first list after sending the environment information of selected devices.

29. The device information acquiring method as claimed in claim 27, further comprising:
deleting the second list after downloading the selected optimum software information.

30. The device information acquiring method as claimed in claim 27, further comprising:
deleting the client execution program after installing the downloaded optimum software information.

31. The device information acquiring method as claimed in claim 4, wherein the file is used for communication between the client execution program and the arbitrary program.

32. An apparatus adapted to acquire device information related to devices from a Web site provided by a server apparatus via one or a plurality of networks, comprising:
a storage part;
a checking part configured to check an environment of the apparatus from which the Web site is accessed, including at least one device usable by the apparatus, and to send environment information indicative of the environment to the server apparatus; and
an installing part configured to install, into the storage part, device information of said at least one device downloaded from the server apparatus by a server execution program that is executed by the server apparatus in response to the environment information,
wherein said checking part comprises a receiving part configured to receive a client execution program which is independent of an operating system of the apparatus, and an arbitrary program which is dependent of said operating system, that are downloaded together from the server apparatus in response to a request from the apparatus, and said checking part checks the environment of the apparatus by said client execution program via said arbitrary program.

33. A computer-readable program, stored on a computer-readable medium, which, when executed by a server computer causes said server computer to manage device information related to devices used by client terminals and provide the device information requested from the client terminals via one or a plurality of networks, comprising executing:
A procedure causing the server computer to download, a client execution program which is independent of an operating system of an arbitrary client terminal, and an arbitrary program which is dependent of said operating system, said client execution program and said arbitrary program being downloaded together to the arbitrary client terminal in response to a request from the arbitrary client terminal, said client execution program being executed by the arbitrary client terminal to check and send environment information indicative of an environment of the arbitrary client terminal to the server apparatus via said arbitrary program; and
A procedure causing the server computer to download the device information of at least one device usable by the arbitrary client terminal and stored in a storage unit of the server computer, from the server computer to the arbitrary client terminal, by a server execution program executed by the server computer, based on the environment information received from the arbitrary client terminal and including information with respect to said at least one device, so that the arbitrary client terminal installs the downloaded device information therein,
Wherein the device information stored in the storage part includes most recent versions of data transfer programs and device drivers.

* * * * *